United States Patent
Kobayashi et al.

(10) Patent No.: US 9,493,683 B2
(45) Date of Patent: Nov. 15, 2016

(54) METHOD OF PRODUCING A CHLOROPRENE-BASED POLYMER, POLYCHLOROPRENE LATEX AND ADHESIVE COMPOSITION

(75) Inventors: Naoki Kobayashi, Itoigawa (JP); Mikio Konno, Sendai (JP); Daisuke Nagao, Sendai (JP); Yoshihiro Mashiko, Itoigawa (JP); Toshiaki Otsu, Itoigawa (JP)

(73) Assignees: Denka Company Limited, Tokyo (JP); Tohoku University, Miyagi (JP)

( * ) Notice: Subject to any disclaimer, the term of this patent is extended or adjusted under 35 U.S.C. 154(b) by 0 days.

(21) Appl. No.: 13/382,837

(22) PCT Filed: Jul. 8, 2010

(86) PCT No.: PCT/JP2010/061607
§ 371 (c)(1),
(2), (4) Date: Jan. 6, 2012

(87) PCT Pub. No.: WO2011/004860
PCT Pub. Date: Jan. 13, 2011

(65) Prior Publication Data
US 2012/0172523 A1 Jul. 5, 2012

(30) Foreign Application Priority Data
Jul. 9, 2009 (JP) ................. 2009-162586

(51) Int. Cl.
| | | |
|---|---|---|
| C08L 11/02 | (2006.01) |
| C08L 11/00 | (2006.01) |
| C09J 111/02 | (2006.01) |
| C08F 2/24 | (2006.01) |
| C08F 2/22 | (2006.01) |
| C08F 2/26 | (2006.01) |
| C08F 36/18 | (2006.01) |

(52) U.S. Cl.
CPC ............... *C09J 111/02* (2013.01); *C08F 2/22* (2013.01); *C08F 2/24* (2013.01); *C08F 2/26* (2013.01); *C08F 36/18* (2013.01)

(58) Field of Classification Search
CPC ............ C08F 36/18; C08F 2/24; C08F 2/22
USPC ......................................................... 524/804
See application file for complete search history.

(56) References Cited

U.S. PATENT DOCUMENTS

| | | | |
|---|---|---|---|
| 8,487,060 B2 * | 7/2013 | Kobayashi et al. ......... 526/295 |
| 2009/0036608 A1 | 2/2009 | Ozoe | |

FOREIGN PATENT DOCUMENTS

| EP | 0516360 A1 | 12/1992 |
|---|---|---|
| JP | 7-292010 A | 11/1995 |
| JP | 8-198903 A | 6/1996 |
| JP | 8-198903 A | 8/1996 |
| JP | 2007-63370 A | 3/2007 |
| JP | 2008-231226 A | 2/2008 |
| JP | 2008-133389 A | 6/2008 |
| JP | 2008-231226 A | 10/2008 |
| JP | 2008-133389 A | 12/2008 |
| JP | 2009-191182 A | 8/2009 |
| WO | 2007/007681 A1 | 1/2007 |

OTHER PUBLICATIONS

International Search Report of International Application No. PCT/JP2010/061607 dated Aug. 3, 2010.
"Kinetics and Mechanism of Vinyl Chloride Polymerization" J. Ugelstad, P.C. Mork and F.K. Hansen, Laboratory of Industrial Chemistry, University of Trondheim, Norway K.H. Kaggerud and T. Ellingsen, Sintef, NTH, Trondheim, Pure and Applied Chemistry, vol. 53, No. 2, Jan. 1, 1981, pp. 323-363.
Supplementary European Search Report EP 10 79 7171 dated Jul. 9, 2013.

* cited by examiner

*Primary Examiner* — Michael A Salvitti
(74) *Attorney, Agent, or Firm* — Roberts Mlotkowski Safran Cole & Calderon, PC (57) ABSTRACT

Provided is a polychloroprene latex extremely superior in adhesion properties.
According to the present invention, chloroprene or a mixture of chloroprene and a monomer copolymerizable with chloroprene is polymerized in the presence of a surfactant in an aqueous medium, in which the surfactant's concentration is lower than its critical micelle concentration (CMC) to obtain a polychloroprene latex. The polychloroprene latex produced according to the present invention is extremely superior in adhesion properties and others and give a smaller amount of deposits during production.

12 Claims, 3 Drawing Sheets

METHOD OF PRODUCING A CHLOROPRENE-BASED POLYMER, POLYCHLOROPRENE LATEX AND ADHESIVE COMPOSITION

TECHNICAL FIELD

The present invention provides a method of producing a chloroprene-based polymer by polymerization in an aqueous medium and a polychloroprene latex extremely superior in adhesion properties that is obtained by the method.

BACKGROUND ART

Polychloroprene-based adhesives have been mostly solvent-type adhesives, which are mainly used as dissolved in an organic solvent such as toluene, hexane, ethyl acetate, methylethylketone, cyclohexane or the like, and thus, there was a concern about environmental pollution and the like. Thus, so-called aqueous adhesives, which do not use any organic solvent, have been developed eagerly, but adhesives made with traditional polychloroprene latexes had a problem that the adhesiveness and the water resistance thereof were unsatisfactory.

Traditional polychloroprene latexes were produced via the so-called emulsion polymerization mechanism, as chloroprene or a mixture of chloroprene and a monomer copolymerizable with chloroprene is emulsified in water with an emulsifier such as rosin acid soap, sodium alkylsulfate, higher alcohol sulfate ester sodium salt, polyoxyethylene alkyl ether, alkyl amine salt, quaternary ammonium salt or polyvinylalcohol and polymerized by addition of a radical initiator such as potassium persulfate. However, the mechanism generally demands a great amount of the emulsifier and thus, there was pointed out a problem of significant deterioration in adhesion properties and water resistance due to inhibition of the adhesiveness inherent to the polychloroprene. For that reason, there have been many attempts to develop a method of producing a polychloroprene latex having a reduced emulsifier content.

A known method of obtaining polymer particles without use of an emulsifier is soap-free polymerization. The soap-free polymerization is a method of producing polymer fine particles in water as solvent without addition of a soap and has been used as a technology favorably applicable for production of pollution-free adhesives and bonding agents and inks. In short, the difference between the emulsion polymerization and the soap-free polymerization is the presence or absence of the micelles of the soap molecule, and polymerization with an emulsifier in an amount of less than its critical micelle concentration (CMC) is also a soap-free polymerization, when seen from the viewpoint of polymerization mechanism. The boundary between them can be identified easily by the change in the number of the polymer particles generated when polymerization is carried out at different emulsifier concentrations, and the soap-free polymerization can give more large-sized and monodispersed particles than the emulsion polymerization.

The surfactant is dispersed ionically in an aqueous solution when the concentration is quite low, but forms stable micelles by association in the aqueous solution when the concentration increases and reaches the saturation point of dispersion. The micelle-forming concentration, which resides in a very narrow range, is called critical micelle concentration (hereinafter, referred to simply as CMC). The CMC varies according to the kind of the surfactant, the temperature of the aqueous surfactant solution, the salt concentration in the aqueous surfactant solution and other external conditions, but is normally about $10^{-5}$ mol/l to $10^{-2}$ mol/l. CMC's of various surfactants are described in detail in Surfactant Handbook, Revised Edition (published by Kougakutosho Ltd.) However, there has been no disclosure on soap-free polymerization of chloroprene.

For example, a method of polymerizing a hydrophobic vinyl monomer in an aqueous medium in the absence of emulsifier is disclosed as a method similar to the soap-free polymerization (Patent Document 1). However, disclosed therein is mostly description on monomers such as styrene, methyl methacrylate and n-butyl methacrylate and there is no description at all about soap-free polymerization of chloroprene, and in addition, it does not describe the inherent problem that soap-free polymerization of chloroprene in the absence of emulsifier results in formation of a great amount of deposits.

For example, a method of using a polychloroprene-based random copolymer having a hydrophilic group additionally (Patent Document 2) and a method of using additionally a polychloroprene-based polymer having a acidic functional group at the terminal in the presence of a suitable amount of a hydrophilic solvent (Patent Document 3) are reported as the processes of producing a polychloroprene latex containing almost no emulsifier (soap-less polychloroprene latex).

However, all of these methods use a chloroprene-based polymer having a surface activity for compensation of insufficient emulsifying force, and polychloroprene latexes are produced by emulsion polymerization, when seen from the viewpoint of polymerization mechanism. The method of the present invention, in which the chloroprene latex is produced via the soap-free polymerization mechanism, is significantly different in polymerization mechanism from the technologies above. In addition, these technologies are two-step production methods having a step of preparing a terminally functionalized polychloroprene-based copolymer and a step of preparing a polychloroprene latex by using the polychloroprene-based copolymer obtained and thus have an industrially disadvantageous aspect.

CITATION LIST

Patent Documents

[Patent Document 1] Japanese Unexamined Patent Application Publication No. 8-198903
[Patent Document 2] Japanese Unexamined Patent Application Publication No. 2008-133389
[Patent Document 3] Japanese Unexamined Patent Application Publication No. 2008-231226

SUMMARY OF INVENTION

Technical Problem

As described above, there is an urgent need for a new chloroprene-based polymer and a polychloroprene latex that give an adhesive improved in adhesion properties such as initial strength and an object of the present invention is to satisfy such a need.

Solution to Problem

After intensive studies to overcome the problems above, the inventors have found a method of preparing a polychloroprene latex more reliably and easily by producing a chloroprene-based polymer (polychloroprene latex) via soap-free polymerization mechanism in an aqueous medium in the presence of a surfactant (emulsifier or dispersant), the addition amount thereof being lower than its critical micelle concentration (CMC), and also found that it is possible to overcome the traditional problems such as that in initial adhesive strength significantly with the polychloroprene latex, and made the present invention.

Specifically, the present invention relates to a method of producing a chloroprene-based polymer, comprising polymerizing chloroprene or a mixture of chloroprene and a monomer copolymerizable with chloroprene in the presence of a surfactant in an aqueous medium, to which the surfactant being added at a concentration of less than its critical micelle concentration (CMC). In the present invention, the coefficient of variation Cv (=standard deviation/average particle diameter×100) of the particles of the chloroprene-based polymer, which are formed by polymerization of chloroprene or a mixture of chloroprene and a monomer copolymerizable with chloroprene, may be in the range of 1 to 30%, and the average particle diameter of the particles may be in the range of 0.05 to 2 µm. In the present invention, an anionic surfactant may be initially added as surfactant before polymerization of chloroprene. In the present invention, the term "A to B" means A or more and B or less and, when there is no unit indicated for A, the unit of A is the same as the unit of B (%, µm, or the like). The present invention also relates to a polychloroprene latex prepared by the production method and an adhesive composition containing the polychloroprene latex.

Advantageous Effects of Invention

It is possible according to the present invention to polymerize chloroprene in an aqueous medium without need for a large amount of a surfactant (emulsifier or dispersant) in the polymerization step and without introduction of a surface-active hydrophilic group and to obtain a polychloroprene latex superior in adhesion properties such as initial adhesive strength with generation of only a smaller amount of deposits. Because the chloroprene polymerization step does not need to be divided into multiple steps in the present invention, the production process is simpler than traditional processes. It is also possible by the method of producing a chloroprene-based polymer according to the present invention to prepare polymer particles having an average particle diameter of 0.05 to 2 µm and to prepare a chloroprene-based polymer having a wide range of particle size distribution (1 to 30%). The polychloroprene latex obtained in the present invention, which is drastically improved in adhesion properties, is favorable for adhesion of materials in the same kind or in different kinds, such as papers, woods, cloths, jerseys, natural and synthetic leathers, rubbers, plastics, foams, ceramics, glass, cements and metals.

DESCRIPTION OF EMBODIMENTS

The surfactant (emulsifier or dispersant) for use in the present invention is not particularly limited, and examples of known surfactants include anionic surfactants, nonionic surfactants, cationic surfactants and others. Examples of the anionic surfactants include rosin acid salts, higher fatty acid salts, alkenylsuccinic acid salts, sodium alkylsulfate, higher alcohol sulfate ester sodium salts, alkylbenzenesulfonic acid salts, alkyldiphenyletherdisulfonic acid salts, sulfonate salts of higher fatty acid amide, sulfate ester salts of higher fatty acid alkylol amide, alkylsulfobetaines and the like; examples of the nonionic surfactants include polyoxyethylene alkyl ethers, polyoxyethylene sorbitan fatty acid esters, higher fatty acid alkanol amides, polyvinylalcohol; and examples of the cationic surfactants include alkylamine salts, quaternary ammonium salts and the like.

The polymerization is characterized in that it is carried out in an aqueous medium in the presence of such a surfactant. For more efficient polymerization, the surfactant is preferably added in an amount of 0.00001 wt part or more based on 100 wt parts of the aqueous medium and less than the CMC of the surfactant. When the addition amount of the surfactant is less than 0.00001 wt part, the amount of the polymer (deposit) formed on the polymerization reactor increases, leading to drastic decrease in yield and causing staining of the container. Alternatively, a surfactant addition amount of more than the CMC leads to drastic decrease of adhesion strength. The CMC is a CMC, as measured in pure water, and for example, the CMC of sodium dodecylbenzenesulfonate (DBS) is 1.2 mmol/dm$^3$·H$_2$O in pure water at 60° C. (as determined by conductivity method) and the CMC of sodium dodecylsulfate (SDS) is 8.1 mmol/dm$^3$·H$_2$O in pure water at 50° C. (as determined by surface tension method).

In the present invention, the value of CMC in pure water at 50° C. (as determined by surface tension method) is used, independently of the temperature of the aqueous medium actually used. When the aqueous medium actually used contains a medium other than water, the medium is assumed to be pure water and the concentration of the surfactant in the aqueous medium is adjusted to be less than the CMC in pure water at 50° C. For example if the surfactant is SDS, because the CMC of SDS is 8.1 mmol/dm$^3$·H$_2$O in pure water at 50° C., SDS is added to 1 dm$^3$ of the aqueous medium (containing water and others solvents) in an amount of less than 8.1 mmol.

The surfactants may be used in combination of two or more and, in this case, the maximum amount of all surfactants added is the CMC of a surfactant having the lowest CMC among the surfactant species added. In other words, the total amount of the surfactants in the aqueous medium is adjusted to be less than the CMC. For example, when surfactant A having a CMC of 1 mmol/dm$^3$·H$_2$O and surfactant B having a CMC of 2 mmol/dm$^3$·H$_2$O are used, the total concentration of the surfactants A and B is adjusted to be less than 1 mmol/dm$^3$·H$_2$O.

The aqueous medium for use in the present invention is a medium containing water at a rate of 50 wt % or more, and organic solvents such as alcohols may be added, but the content of water in the aqueous medium is preferably 90 wt % or more. When the addition amount of the organic solvents is 10 wt % or more and the water content is less than 90 wt %, it may exert adverse effect on the properties of the resulting chloroprene latex.

In the present invention, the method of adding the surfactant is not particularly limited and may be altered arbitrarily according to purpose, for example for preparation of monodispersed particles or for preparation of particles with a larger particle diameter. For preparation of a particularly stable polychloroprene latex at improved productivity, a method of initially adding an anionic surfactant at a concentration close to the CMC before polymerization is favorable.

In the present invention, the chloroprene is the monomer of chloroprene, specifically 2-chloro-1,3-butadiene. Examples of the monomers copolymerizable with chloroprene include 1,3-butadienes such as 2,3-dichloro-1,3-butadiene, 2-cyano-1,3-butadiene, 1-chloro-1,3-butadiene, 1,3-butadiene and isoprene; styrenes such as styrene, α-methyl styrene, p-chloro methyl styrene, p-cyano styrene, p-acetoxystyrene, p-styrenesulfonyl chloride, ethyl p-styrenesulfonate, p-butoxy styrene, 4-vinylbenzoic acid, and 3-isopropenyl-α,α'-dimethylbenzyl isocyanate; methacrylic esters such as methyl methacrylate, glycidyl methacrylate, 2-hydroxyethyl methacrylate, 2-hydroxy propyl methacrylate, 4-hydroxybutyl methacrylate, 2-(dimethylamino)ethyl methacrylate, 2-(diethylamino)ethyl methacrylate, 3-(dimethylamino)propyl methacrylate, 2-(isocyanato)ethyl methacrylate, 2,4,6-tribromophenyl methacrylate, 2,2,3,3-tetrafluoropropyl methacrylate, 2,2,2-trifluoroethyl methacrylate, 2,2,3,3,3-pentafluoropropyl methacrylate and 2,2,3,4,4,4-hexafluorobutyl methacrylate; acrylic esters such as butyl acrylate, ethyl acrylate, 2-ethylhexyl acrylate, 2-ethoxyethyl acrylate, 2-butoxyethyl acrylate, cyclohexyl acrylate, 3-(trimethoxysilyl)propyl acrylate, 2,2,3,3-tetrafluoropropyl acrylate, 2,2,2-trifluoroethyl acrylate, 2,2,3,3,3-pentafluoropropyl acrylate and 2,2,3,4,4,4-hexafluorobutyl acrylate; acrylonitrile, methacrylonitrile, α-cyanoethyl acrylate, maleic anhydride, maleic acid, citraconic anhydride, vinylacetic acid, maleic acid esters, fumaric acid esters, crotonic acid, itaconic acid, fumaric acid, mono-2-(methacryloyloxy)ethyl phthalate, mono-2-(methacryloyloxy)ethyl succinate, mono-2-(acryloyloxy)ethyl succinate, methacrylic acid, acrylic acid, acrolein, diacetone acrylamide, vinyl methyl ketone, vinyl ethyl ketone, diacetone methacrylate and the like. Favorable among them from the point of high radical copolymerization efficiency with chloroprene are 2,3-dichloro-1,3-butadiene, 2-cyano-1,3-butadiene, 1-chloro-1,3-butadiene, styrene, methyl methacrylate, methacrylic acid, glycidyl methacrylate, 2-hydroxyethyl methacrylate, 2-hydroxypropyl methacrylate, 4-hydroxybutyl methacrylate, α-cyanoethyl acrylate, maleic anhydride and maleic acid. 2,3-dichloro-1,3-butadiene, which is highest in copolymerizablity with chloroprene, is more favorable. These compounds may be used in combination of two or more, as needed.

The addition amount of the chloroprene and the monomer copolymerizable with chloroprene is preferably 1 to 50 wt parts based on 100 wt parts of the aqueous medium, and it is possible to obtain a particularly stable polychloroprene latex, when the addition amount is in the range above.

The method of adding chloroprene is not particularly limited, but, it is preferable to add part of the chloroprene to the polymerization system continuously or intermittently during polymerization for acceleration of polymerization and improvement in productivity. For example, 10 to 50 wt parts of the entire chloroprene (100 wt parts) is added first to the polymerization system for initiation of polymerization and the remaining monomer, which is kept at a temperature lower than the polymerization temperature, is added to the polymerization system continuously for polymerization in the period from the time when the conversion rate reaches 1 to 40% to the time when polymerization ends. Even in such a case, in the present invention, there is no need to change the aqueous medium after initiation of polymerization and the polymerization of chloroprene can be carried out without neutralization. It is possible in the present invention to obtain a chloroprene-based polymer by polymerizing chloroprene continuously in the same aqueous medium.

The chloroprene-based polymer in the present invention is a homopolymer of chloroprene or a copolymer of chloroprene and a monomer copolymerizable with it. The gel content in the polychloroprene latex can be controlled by adjustment of the amount of the chain-transfer agent used during polymerization of chloroprene, polymerization temperature and polymerization rate, and it is preferable to take a measure of decreasing the amount of the chain-transfer agent, raising the polymerization temperature or increasing the polymerization rate for increase of the gel content.

The chain-transfer agent is not particularly limited, if it is an agent commonly used in production of polychloroprene, and examples thereof for use are known chain-transfer agents including mercaptans such as n-dodecylmercaptan, octylmercaptan, hexylmercaptan, t-butylmercaptan, thioglycol acid, thiomalic acid and thiosalicylic acid; sulfides such as diisopropylxanthic disulfide, diethylxanthic disulfide and diethylthiuram disulfide; halogenated hydrocarbons such as iodoform; diphenylethylene, p-chlorodiphenylethylene, p-cyanodiphenylethylene, α-methylstyrene dimer, sulfur and the like.

Examples of the catalysts used in polymerization of polychloroprene include peroxide compounds such as benzoyl peroxide, lauroyl peroxide, t-butyl hydroperoxide, p-menthane hydroperoxide, dicumyl peroxide, potassium persulfate and ammonium persulfate; azo compounds such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutylonitrile), 1,1'-azobis(cyclohexane-1-carbonitrile), 1-[(1-cyano-1-methylethyl)azo]formamide, dimethyl 2,2'-azobis(2-methylpropionate), 4,4'-azobis(4-cyanovaleric acid), 2,2'-azobis(2,4,4-trimethylpentane), 2,2'-azobis{2-methyl-N-[1,1'-bis(hydroxymethyl)-2-hydroxyethyl]propionamide}, 2,2'-azobis{2-(2-imidazolin-2-yl)propane]dihydrochloride, 2,2'-azobis{2-(2-imidazolin-2-yl)propane]disulfate dihydrate, 2,2'-azobis{2-[1-(2-hydroxyethyl)-2-imidazolin-2-yl)propane]}dihydrochloride, 2,2'-azobis(1-imino-1-pyrrolidino-2-methylpropane)dihydrochloride, 2,2'-azobis(2-methylpropionamidine)dihydrochloride and 2,2'-azobis[N-(2-carboxyethyl)-2-methylpropionamidine]tetrahydrate, and the like. Among them, use of potassium persulfate is preferable for particularly stabilized polymerization.

The amount thereof added is arbitrary, but an amount of about 0.01 to 10 wt parts based on 100 wt parts of chloroprene is favorable. Addition of an ionic initiator in an amount of 10 wt parts or more leads to excessive increase in ionic strength, which in turn leads to instabilization of the particles. The method of adding the catalyst is not particularly limited, and may be, for example, collective addition, dropwise addition, divided addition or a combination thereof.

For example, sodium sulfite, ferrous sulfate, sodium anthraquinone-β-sulfonate, formamidinesulfonic acid, L-ascorbic acid or the like may be added together for improvement in activity of the catalyst used for polymerization of polychloroprene latex.

A polymerization inhibitor, such as thiodiphenylamine, diethylhydroxylamine, hydroquinone, p-t-butyl catechol, 1,3,5-trihydroxybenzene, hydroquinone methylether, 2,6-di-t-butyl-4-methylphenol, 2,2-methylene-bis(6-t-butyl-4-methylphenol), 4,4-butylene-bis(6-t-butyl-3-methylphenol), ethylene bis(oxyethylene) bis[3-(5-t-butyl-4-hydroxy-m-tolyl)propionate], octadecyl-3-(3,5-di-t-butyl-4-hydroxyphenyl)propionate or pentaerythritol tetrakis[3-(3,5-di-t-butyl-4-hydroxyphenyl)propionate], may be added to terminate the polymerization of polychloroprene latex.

The polymerization temperature is preferably in the range of 0 to 55° C. for control of polymerization. The polymerization temperature is particularly preferably in the range of 30 to 50° C. for smoother and safer polymerization reaction. Alternatively, the polymerization time is not particularly limited and may be determined arbitrarily according to the desired particle diameter of the polychloroprene latex, but is normally about 1 to 36 hours.

The solid matter concentration of the polychloroprene latex can be adjusted to a particular concentration by concentration or dilution with water. Higher solid matter concentration gives a latex that can be dried sooner and has a higher initial strength. The solid matter concentration can be also controlled by the ratio of the monomer during polymerization.

The polychloroprene latex is acidic immediately after polymerization, but the pH can be controlled arbitrarily for example with a pH adjuster. The pH adjuster is preferably a salt of weak acid and examples thereof include inorganic salts such as sodium carbonate, potassium carbonate, trisodium phosphate, disodium hydrogen phosphate, tripotassium phosphate, dipotassium hydrogen phosphate, tripotassium citrate, dipotassium hydrogen citrate, trisodium citrate, disodium hydrogen citrate, sodium acetate, potassium acetate and sodium tetraborate. The pH adjuster may be sodium hydroxide or potassium hydroxide, or alternatively a basic substance such as diethanolamine. The method of adding the pH adjuster is not particularly limited and a pH adjuster powder may be added directly or as diluted in water to a desired rate.

Although the polychloroprene latex obtained in the present invention is stable, a scaling inhibitor may be coated to form a coat film on the internal surface of the polymerization tank or the apparatuses connected thereto, for more stabilization of the basic properties of the polychloroprene latex. Compositions containing a hydroxynaphthalene compound can be used as the scaling inhibitors, and examples thereof that are commercially available include NOXOL WSW, NOXOL ETH and NOXOL ETH/S produced by CIRS, Inc.

The scaling inhibitor can be applied, for example, by coating with a roller or a brush or by spraying using a known atomizing apparatus such as sprayer or steam ejector. The coating amount, as the solid matter of scaling inhibitor, is in the range of 0.001 to 0.5 g/m$^2$, preferably in the range of 0.003 to 0.3 g/m$^2$ from the points of effectiveness and economy. The coated film may be heated at a temperature of 50 to 150° C. for preparation of a strong film. If it is likely that there is some staining that may inhibit film formation on the surface of the polymerization tank, it is preferable, before coating, to make clear metal surface exposed for example by cleaning the surface using an organic solvent or detergent or by washing the surface with pure water.

It is possible to make the effect more distinctive, by washing off the substance remaining on the surface of the polymerization tank with pure water after preparation of the coated film. It is possible to repeat polymerization operation several times before the effect obtained by one coating deteriorates. The frequency of coating varies according to the use condition and coating is preferably performed once again before deterioration of the effect. The coat film is preferably formed under the atmosphere of an inert gas such as nitrogen or argon. The material for the polymerization tank is for example stainless steel, which may be lined with glass or rubber.

EXAMPLES

Hereinafter, the present invention will be described more in detail with reference to Examples, but it should be understood that the present invention is not limited to these Examples. The "wt part" in Examples and Comparative Examples is a value based on 100 wt parts of chloroprene, unless specified otherwise.

A common 1500-ml four-necked glass separable flask equipped with a tilted paddle, a thermometer, a condenser tube and a nitrogen inlet was used as the polymerization reactor in the present invention. A blade with four plate-shaped baffles was used as the agitation blade.

Example 1

918.5 wt parts of pure water containing 0.02 wt part of sodium dodecylbenzenesulfonate (hereinafter, referred to simply as DBS, trade name: Neopelex G-65, manufactured by Kao Corp.) was placed in a 1500-ml glass flask equipped with a three-way cock. The addition amount is that of Neopelex G-65 and not that of pure DBS. The CMC of the DBS was about 0.4 wt part (about 0.04 wt part in 100 wt parts of pure water at 50° C.).

Then after sufficient nitrogen bubbling of the mixture, 100 wt parts of chloroprene was added thereto, and the mixture was heated to an internal temperature of 40° C. under a stirring condition of 300 rpm. After the heating, an aqueous initiator solution containing 2.22 wt parts of potassium persulfate (hereinafter, referred to simply as KPS) and 0.089 wt part of sodium anthraquinone-β-sulfonate in 108.7 wt parts of pure water was then added thereto collectively, for initiation of polymerization. The chloroprene polymerization conversion rate reached 91%, 21 hours after initiation of polymerization. There was almost no deposit observed on the container during recovery of the latex. The unreacted monomer was removed by rotary evaporator, to give a polychloroprene latex.

The particle diameter distribution of the latex was determined in the following manner:

[Measurement of Particle Diameter Distribution]

The latex immediately after termination of polymerization reaction was diluted with distilled water to a solid matter concentration of 0.05% by mass, and the particle diameter distribution thereof was analyzed using Microtrac UPA (product of Nikkiso Co., Ltd.), to give its average particle diameter and the coefficient of variation Cv of the particles. The average particle diameter of the latex is $D_{50}$% particle diameter (particle diameter at a volume-averaged cumulative particle distribution of 50%, also called median diameter), as determined by laser diffraction/scattering method. Alternatively, the degree of dispersion of the particles was calculated approximately by the Formula below:

Coefficient of variation Cv=(Standard deviation/Average particle diameter×100)

The latex obtained was used as it was in the following tests without viscosity adjustment.

[Adhesion Test]

An adhesive composition was coated on two sheets of canvas (25×150 mm) at a load of 150 g (solid matter)/m² and left to stand at room temperature for 10 minutes. The coated surfaces were attached to each other, while they were still in completely wet state, and bonded to each other under pressure by 5 reciprocations of a hand roller. The sample was subjected to the following test on adhesive strength.

[Initial Peeling Strength]

Figure 1:
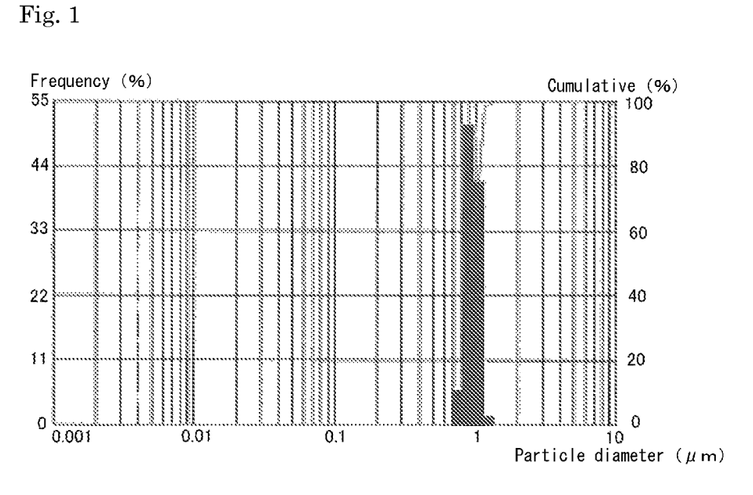
FIG. 1 is a graph showing the particle diameter distribution of the polychloroprene latex obtained in Example 1.

After the sample was left to stand at room temperature for 10 minutes after the roller press, the 180° peeling strength of the sample was determined by using a tensile tester at a tensile speed of 200 mm/minute. The measurement results of the sample obtained in Example 1 are summarized in the following Table 1 and the particle diameter distribution in FIG. 1.

Example 2

Figure 2:
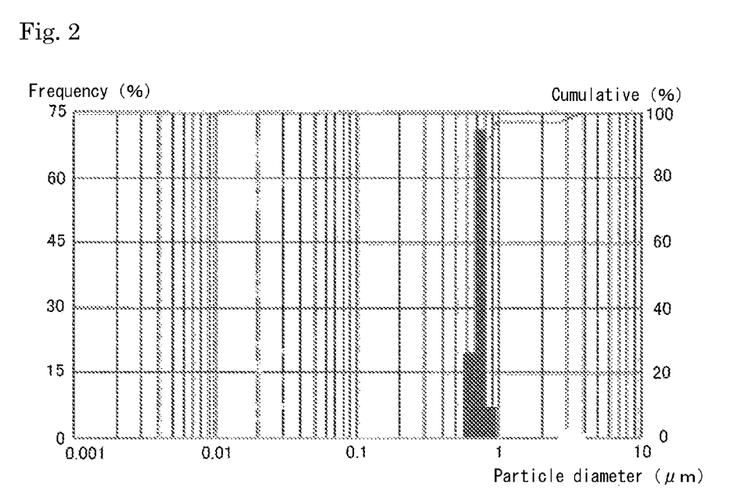
FIG. 2 is a graph showing the particle diameter distribution of the polychloroprene latex obtained in Example 2.

A test was performed similarly to Example 1, except that the polymerization temperature was changed to 50° C. The chloroprene polymerization conversion rate reached 85%, 8.5 hours after initiation of polymerization. There was slight deposit observed during recovery of the latex. The unreacted monomer was removed by a rotary evaporator, to give a polychloroprene latex. The particle diameter distribution of the latex and the initial peeling strength were determined, similarly to Example 1. The measurement results of the sample obtained in Example 2 are summarized in the following Table 1 and the particle diameter distribution in FIG. 2.

Example 3

Figure 3:
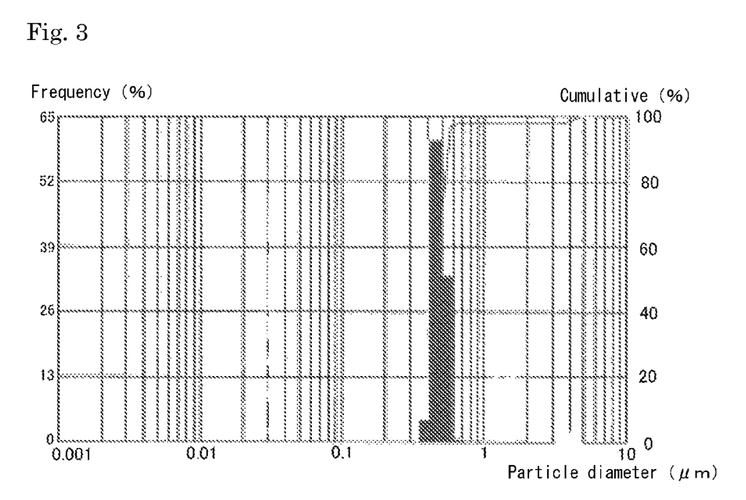
FIG. 3 is a graph showing the particle diameter distribution of the polychloroprene latex obtained in Example 3.

809.7 wt parts of pure water containing 0.1 wt part of sodium dodecylsulfate (hereinafter, referred to simply as SDS) was placed in a 1500-ml glass flask equipped with a three-way cock. The CMC of the SDS is about 2.4 wt parts (about 0.3 wt part in 100 wt parts of pure water at 50° C.). After addition of SDS and sufficient nitrogen bubbling of the solution, 100 wt parts of chloroprene was added to the solution, which was then heated to an internal temperature of 40° C. under the stirring condition of 300 rpm. After the heating, an aqueous initiator solution containing 4.44 wt parts of KPS and 0.178 wt part of sodium anthraquinone-β-sulfonate in 217.5 wt parts of pure water was then added thereto collectively for initiation of polymerization. The chloroprene polymerization conversion rate reached 85%, 10.5 hours after initiation of polymerization. There was slight deposit observed during recovery of the latex. The unreacted monomer was removed by rotary evaporator, to give a polychloroprene latex. The particle diameter distribution of the latex and the initial peeling strength were determined, similarly to Example 1. The measurement results of the sample obtained in Example 3 are summarized in the following Table 1 and the particle diameter distribution in FIG. 3.

Example 4

Figure 4:
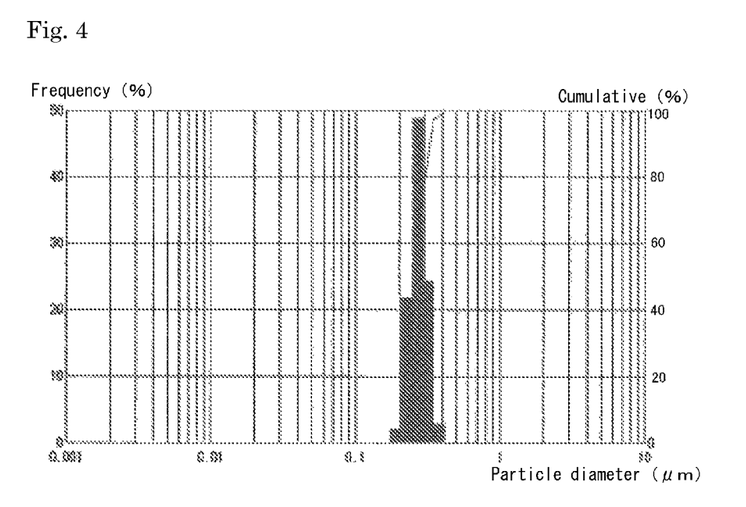
FIG. 4 is a graph showing the particle diameter distribution of the polychloroprene latex obtained in Example 4.

A test was performed similarly to Example 3, except that the amount of the SDS used was changed to 0.296 wt part. The chloroprene polymerization conversion rate reached 91%, 6 hours after initiation of polymerization. There was almost no deposit observed during recovery of the latex. The unreacted monomer was removed by rotary evaporator, to give a polychloroprene latex. The SDS was the same as that used in Example 3. Thus, the CMC of the SDS used in Example 4 was about 2.4 wt parts (about 0.3 wt part in 100 wt parts of pure water at 50° C.). The particle diameter distribution of the latex and the initial peeling strength were determined, similarly to Example 1. The measurement results of the sample obtained in Example 4 are summarized in the following Table 1 and the particle diameter distribution in FIG. 4.

Comparative Example 1

918.5 wt parts of pure water was placed in a 1500-ml glass flask equipped with a three-way cock. Then after sufficient nitrogen bubbling, 100 wt parts of chloroprene was added thereto, and the mixture was heated to an internal temperature of 40° C. under the stirring condition of 300 rpm. After the heating, an aqueous initiator solution containing 2.22 wt parts of KPS and 0.089 wt part of sodium anthraquinone-β-sulfonate in 108.7 wt parts of pure water was then added thereto collectively for initiation of polymerization. However, there was an excessive amount of deposit in the polymerization tank 18 hours after initiation of polymerization, and thus, the polymerization was terminated.

Comparative Example 2

Figure 5:
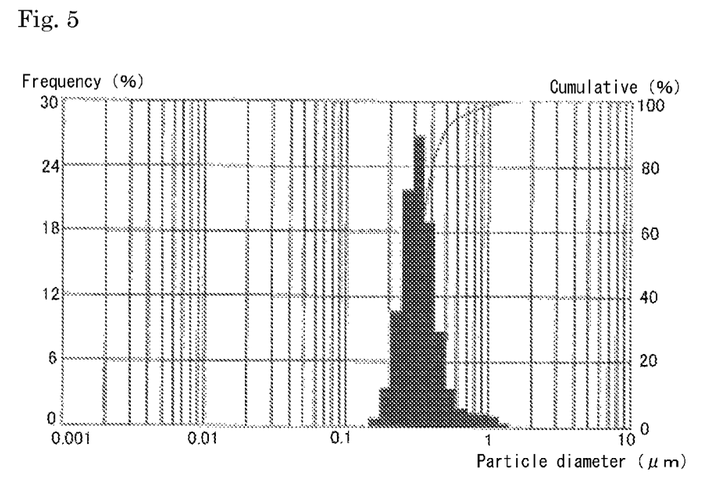
FIG. 5 is a graph showing the particle diameter distribution of the polychloroprene latex obtained in Comparative Example 2.

In a 1500-ml glass flask equipped with a three-way cock, 3.5 wt parts of polyvinylalcohol (PVA-203: manufactured by Kuraray Co., Ltd.) was dissolved in 96 wt parts of pure water at 60° under nitrogen atmosphere. The CMC of PVA-203 is about 0.03 wt parts (about 0.03 wt part in 100 wt parts of pure water at 50° C.). After the aqueous polyvinylalcohol solution was cooled close to room temperature, 97 wt parts of chloroprene, 3.0 wt parts of methacrylic acid and 0.4 wt part of octyl mercaptan were added thereto. Polymerization was started with sodium sulfite and KPS as initiators, while the mixture was kept constant at 45° C. The chloroprene polymerization conversion rate reached 99%, 14 hours after initiation of polymerization. The unreacted monomer was removed by rotary evaporator, to give a polychloroprene latex. The particle diameter distribution of the latex and the initial peeling strength were determined, similarly to Example 1. The measurement results of the sample obtained in Comparative Example 2 are summarized in the following Table 1 and the particle diameter distribution in FIG. 5.

Comparative Example 3

Figure 6:
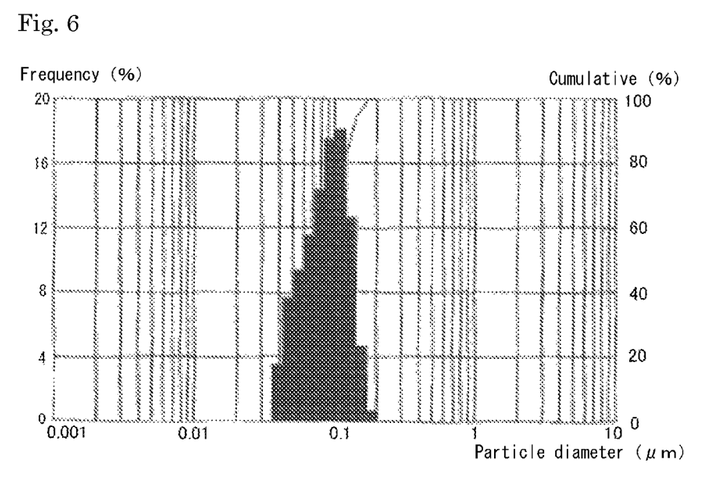
FIG. 6 is a graph showing the particle diameter distribution of the polychloroprene latex obtained in Comparative Example 3.

100 wt parts of pure water, 4.0 wt parts of a disproportionated rosin acid, 1.0 wt part of potassium hydroxide and 0.8 wt part of a condensate of formaldehyde and sodium naphthalenesulfonate salt were placed in a 1500-ml glass flask equipped with a three-way cock, and after solubilization of the mixture, 100 wt parts of chloroprene and 0.1 wt part of n-dodecylmercaptan were added thereto, while the mixture was agitated. The CMC of the disproportionated rosin acid is about 0.43 wt parts (about 0.43 wt part in 100 wt parts of pure water at 50° C.). Polymerization is carried out at 10° C. under nitrogen environment, as potassium persulfate was used as the initiator. The chloroprene polymerization conversion rate reached 90%, 5 hours after initiation of polymerization. The unreacted monomer was removed by rotary evaporator, to give a polychloroprene latex. The particle diameter distribution of the latex and the initial peeling strength were determined, similarly to Example 1. The measurement results of the sample obtained in Comparative Example 3 are summarized in the following Table 1 and the particle diameter distribution in FIG. 6.

TABLE 1

|  | Example | | | | Comparative Example | | |
|---|---|---|---|---|---|---|---|
|  | \multicolumn{7}{c}{Number} | | | | | | |
|  | 1 | 2 | 3 | 4 | 1 | 2 | 3 |
| Polymerization temperature (° C.) | 40 | 50 | 40 | 40 | 40 | 45 | 10 |
| Monomer addition amount Monomer:pure water | 100:1027 | 100:1027 | 100:1027 | 100:1027 | 100:1027 | 100:96 | 100:100 |
| Surfactant addition amount (wt parts) | DBS 0.02 (0.002)*[2] | DBS 0.02 (0.002)*[2] | SDS 0.1 (0.01)*[2] | SDS 0.296 (0.0288)*[2] | None — — | PVA-203 3.500 (3.650)*[2] | Disproportionated rosin acid 4.000 (4.000)*[2] |
| Initiator addition amount (wt parts) | KPS 2.22 | KPS 2.22 | KPS 4.44 | KPS 4.44 | KPS 2.22 | $Na_2CO_3$/KPS 0.10/0.15 | KPS 0.10 |
| Polymerization time (hr) | 21 | 8.5 | 10.5 | 6 | Deposit formed in polymerization tank. Terminated 18 hours after initiation of polymerization. | 14 | 5 |
| Polymerization rate (%) | 91 | 85 | 85 | 91 | | >99 | 90 |
| Average diameter (μm) | 1.0 | 0.74 | 0.47 | 0.27 | | 0.31 | 0.09 |
| Degree of dispersion of particles (%) | 12.1 | 8.0 | 10.4 | 15.9 | | 28.1 | 38.3 |
| Initial peeling strength [N/25 mm] | 1.6 | 1.7 | 1.3 | 1.1 | | <0.01 (Unmeasurable due to low adhesiveness) | |

*[1]The monomer was added, as divided.
*[2]wt parts in 100 wt parts of pure water When the results obtained in Examples 1 to 4 are compared with those obtained in Comparative Examples 2 and 3, the polychloroprene latexes obtained in the Examples are larger in particle diameter and more monodispersed than those in the Comparative Examples. Alternatively when the initial peeling strengths are compared, the polychloroprene latexes in the Examples give a film having drastically large initial adhesion strength, while those obtained in the Comparative Examples have no initial strength at all. It is obvious that the initial adhesion strength of the adhesive composition improves when the addition amount of the surfactant is made less than its CMC.

The invention claimed is:

1. A method of producing a chloroprene-based polymer, comprising:
    adding a surfactant to an aqueous medium at a concentration of from 0.00001 wt. parts or more based on 100 wt. parts of the aqueous medium to an amount that is less than a critical micelle concentration (CMC) of the surfactant, to produce a first mixture;
    nitrogen bubbling the first mixture to produce a second mixture;
    adding chloroprene or a mixture of chloroprene and a monomer copolymerizable with chloroprene of 2,3-dichloro-1,3-butadiene to the second mixture; and
    polymerizing the chloroprene or the mixture of chloroprene and a monomer copolymerizable with chloroprene of 2, 3-dichloro-1,3-butadiene, without introducing a hydrophilic group in the polymer, in the presence of the surfactant in the aqueous medium.

2. The method of claim 1, wherein a coefficient of variation Cv (i.e., standard deviation/average particle diameter×100) of particles is in the range of 1 to 30%.

3. The method of claim 2, wherein an average particle diameter of the particles is in the range of 0.05 to 2 μm.

4. The method of claim 1, wherein an anionic surfactant is initially added as the surfactant before polymerization of the chloroprene.

5. A method of producing a chloroprene-based homopolymer or copolymer, wherein the homopolymer or copolymer is a latex, comprising:
    adding a surfactant to an aqueous medium at a concentration of from 0.00001 wt. parts or more based on 100 wt. parts of the aqueous medium to an amount that is less than a critical micelle concentration (CMC) of the surfactant, to produce a first mixture;
    nitrogen bubbling the first mixture to produce a second mixture; adding chloroprene or a mixture of chloroprene and a monomer copolymerizable with chloroprene of 2,3-dichloro-1,3-butadiene to the second mixture; and
    polymerizing the chloroprene of the mixture of chloroprene and a monomer copolymerizable with chloroprene of 2, 3-dichloro-1,3-butadiene, without introducing a hydrophilic group in the polymer, in the presence of the surfactant in the aqueous medium, wherein the homopolymer or copolymer is a latex.

6. The method of claim 1, wherein the first mixture does not comprise a monomer.

7. A method of producing a chloroprene-based polymer, comprising:
    adding a surfactant to an aqueous medium at a concentration of from 0.00001 wt. parts or more based on 100 wt. parts of the aqueous medium to an amount that is less than the critical micelle concentration of the surfactant, to form a first mixture;
    nitrogen bubbling the first mixture to form a second mixture;
    adding chloroprene or a mixture of chloroprene and 2,3-dichloro-1,3-butadiene to the second mixture to form a third mixture; and
    polymerizing chloroprene or the mixture of chloroprene and 2,3-dichloro-1,3-butadiene, wherein the method does not comprise introducing a hydrophilic group into the polymer.

8. The method of claim 7, wherein a coefficient of variation Cv of particles of the chloroprene-based polymer is in the range of 1 to 30%.

9. The method of claim 8, wherein the particles have an average particle diameter in the range of 0.05 μm to 2 μm.

10. The method of claim 7, wherein the surfactant comprises an anionic surfactant.

11. The method of claim 7, wherein the first mixture does not comprise a monomer and does not comprise a monomer.

12. The method of claim 7, wherein the surfactant is added to the aqueous medium at a concentration of less than the critical micelle concentration of the surfactant and not more than 0.0288 wt parts in 100 wt parts of the aqueous medium.

* * * * *